Sept. 19, 1933.  J. P. HEIL  1,927,032
FLEXIBLE SUPPORT
Filed Oct. 26, 1931   3 Sheets-Sheet 1
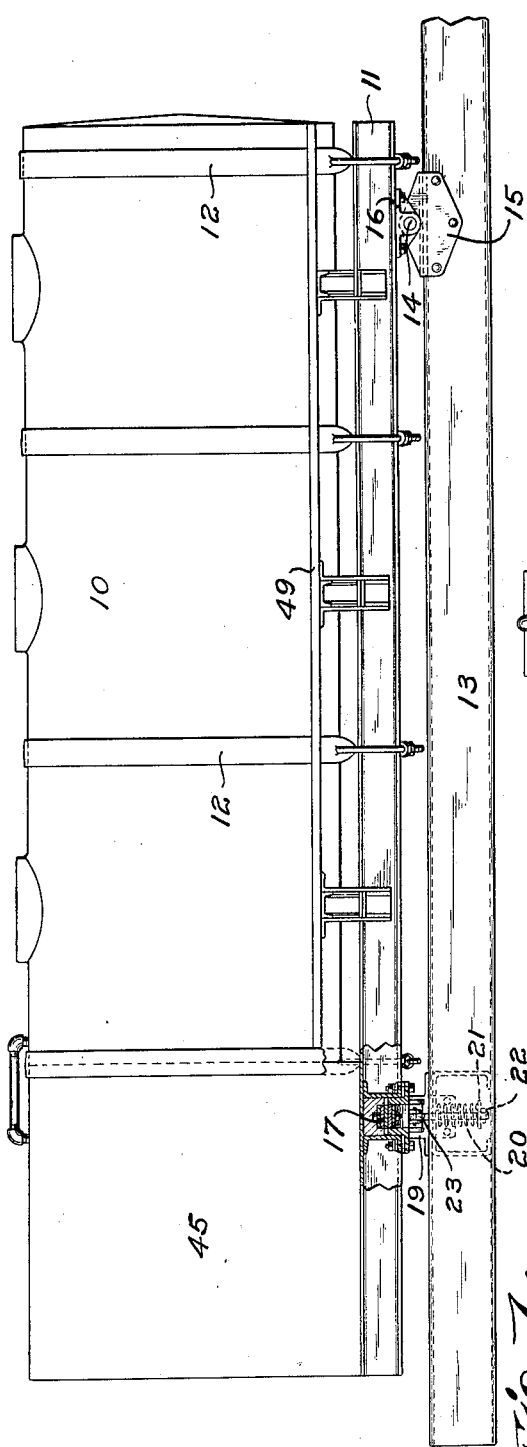
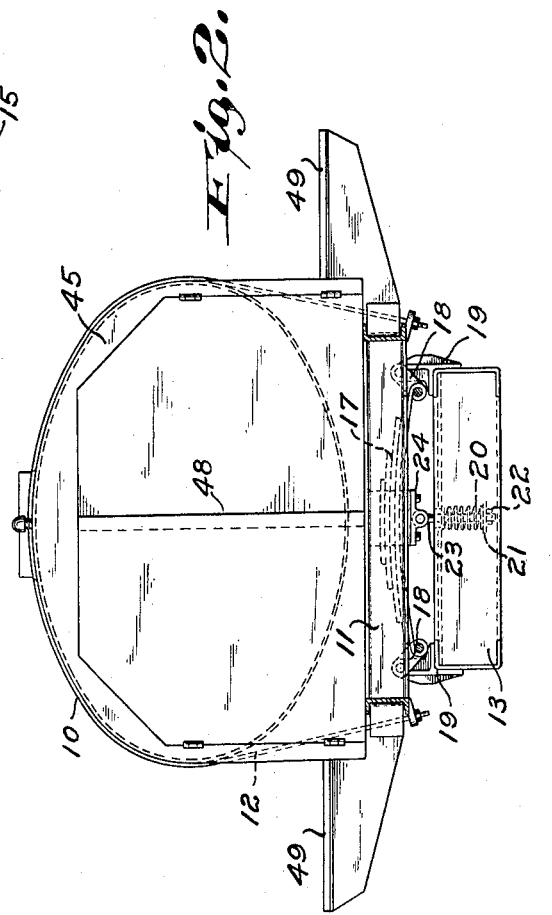
INVENTOR.
J. P. Heil
BY Morsell & Morsell
ATTORNEY.

Sept. 19, 1933.  J. P. HEIL  1,927,032
FLEXIBLE SUPPORT
Filed Oct. 26, 1931  3 Sheets-Sheet 2
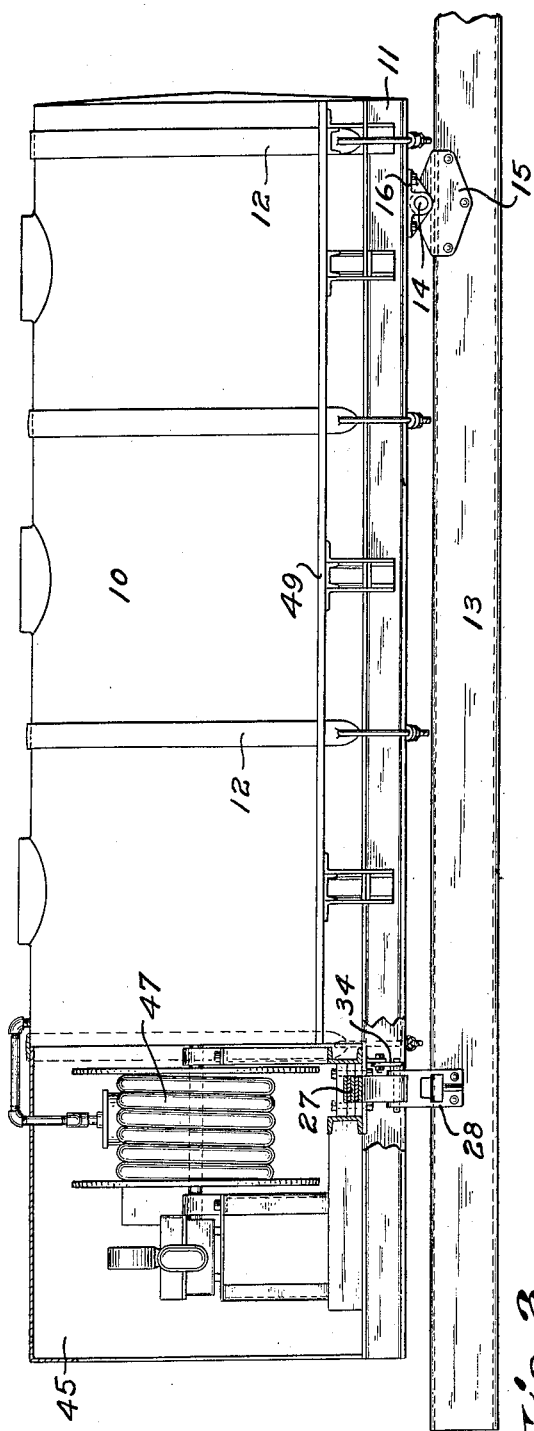
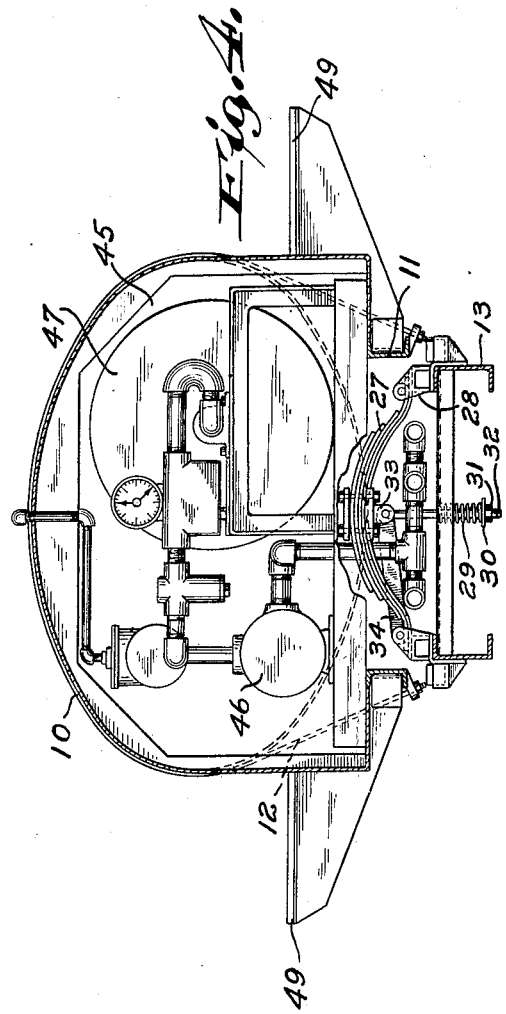
INVENTOR.
BY J. P. Heil
Monsell & Monsell
ATTORNEY.

Sept. 19, 1933.  J. P. HEIL  1,927,032
FLEXIBLE SUPPORT
Filed Oct. 26, 1931   3 Sheets-Sheet 3
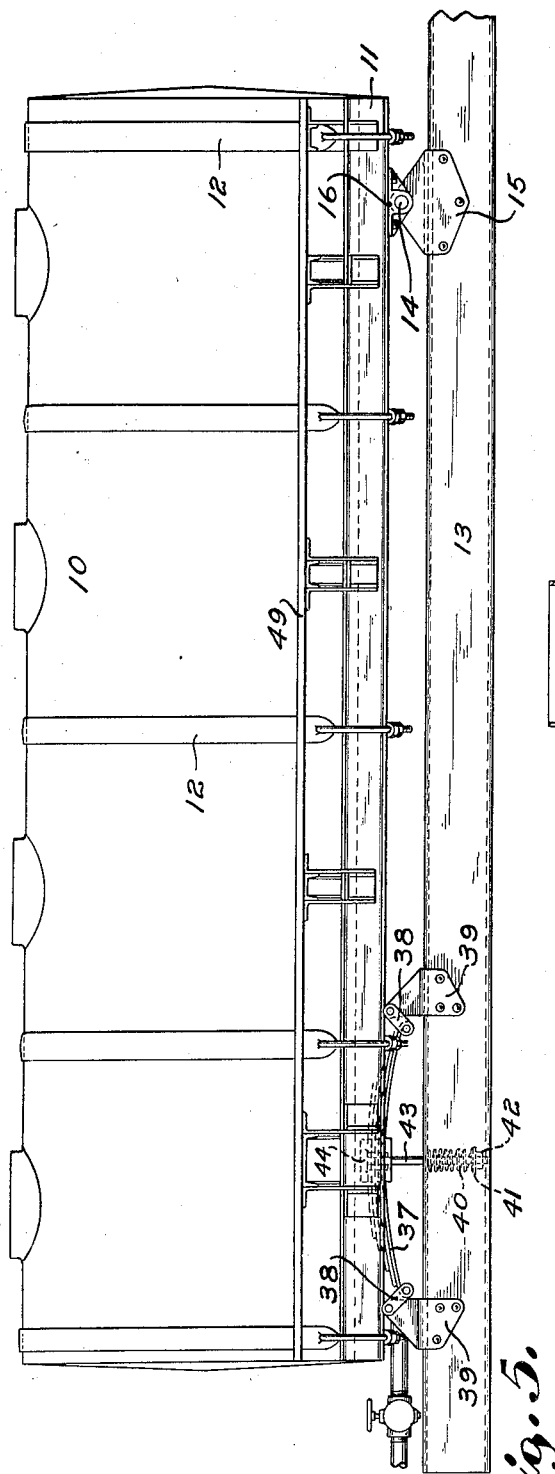
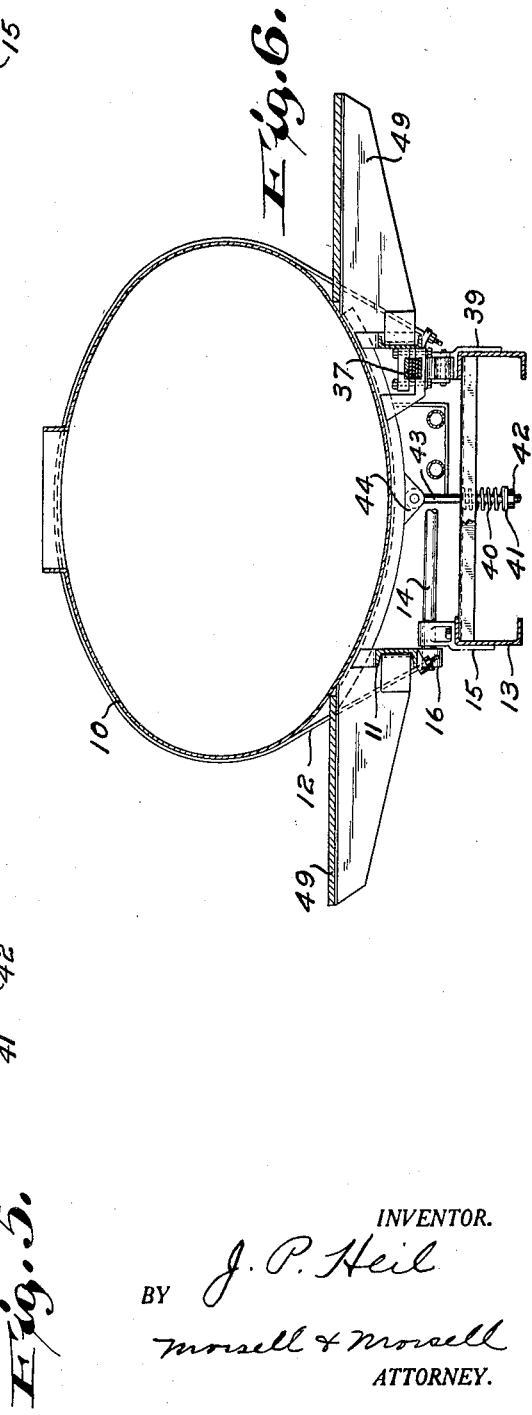
INVENTOR.
J. P. Heil
BY Morsell & Morsell
ATTORNEY.

Patented Sept. 19, 1933

1,927,032

UNITED STATES PATENT OFFICE 1,927,032

FLEXIBLE SUPPORT

Julius P. Heil, Milwaukee, Wis., assignor to The Heil Co., Milwaukee, Wis., a corporation of Wisconsin.

Application October 26, 1931. Serial No. 571,270

6 Claims. (Cl. 280—106.5)

The present invention relates in general to improvements in the art of supporting relatively rigid structures upon comparatively flexible or distortible frames, and relates more specifically to improvements in the construction and operation of flexible supports especially adapted for use in mounting rigid tanks or the like upon road vehicles.

An object of the invention is to provide an improved flexible support which is simple in construction and efficient in operation.

It has heretofore been proposed in order to relieve rigid transportable tanks from undesirable stresses, to provide a stabilizing support between one end of the tank and the flexible transporting tractor frame, and to further provide at the opposite end of the tank a pivotal support having an axis extending longitudinally of the frame and tank. In order to prevent undesirable swaying of the pivot supported tank end about the pivotal axis, helical compression springs were interposed between the tank and the flexible tractor frame laterally adjacent to the pivot. While this prior structure partially relieved the tank of stresses due to flexing of the tractor frame, the rigid interconnection between the frame and one end of the tank, prevented entire relief of these stresses, and the longitudinal pivoting at the other tank end did not maintain the desired stability of the structure and furthermore did not relieve the tank of sudden shocks to which the vehicle frame was subjected.

A more specific object of the present invention is to provide a flexible support for rigid tanks mounted upon distortible vehicle frames, whereby the tanks are entirely relieved of objectionable stresses resulting either from distortion of the supporting frames or from shock to which the frames may be subjected.

Another specific object of the invention is to provide an improved flexible three point suspension or support for tanks or the like mounted upon road vehicle frames.

A further specific object of the invention is to provide an improved dispensing tank support which will avoid leaks in the piping for delivering fluid to and from the tank.

These and other objects and advantages will be apparent from the following detailed description.

A clear conception of several embodiments of the invention, and of the mode of constructing and of utilizing flexible supports built in accordance therewith, may be had by referring to the drawings accompanying and forming a part of this specification in which like reference characters designate the same or similar parts in the various views:

Fig. 1 is a part sectional side elevation of a tank mounted upon a deflectible tractor frame with the aid of one form of the improvement;

Fig. 2 is a rear end view of the tank mounting disclosed in Fig. 1;

Fig. 3 is a part sectional side elevation of a combined tank and fluid dispensing apparatus mounted upon a deflectible tractor frame with the aid of another form of the improved support;

Fig. 4 is a part sectional rear view of the mounting disclosed in Fig. 3;

Fig. 5 is a full side view of a tank mounted upon a deflectible tractor frame with the aid of still another form of improved support; and Fig. 6 is a part sectional rear view of the structure of Fig. 5, part of the section being taken through the front support and the other part section being taken through the rear support.

While the invention has been disclosed herein as being specifically applied to a support for mounting a tank upon a deflectible tractor frame, some of the novel features are obviously more generally applicable wherever it is desirable to provide a three-point suspension or support between relatively rigid and flexible elements.

Referring to the disclosure in Figs. 1 to 6, the rigid tank 10 is secured directly to a relatively stiff auxiliary frame 11 by means of straps 12, and the auxiliary frame 11 is in turn flexibly supported upon the main flexible tractor frame or chassis 13. The tractor main frame or chassis 13 is supported upon the axles through leaf springs in the ordinary and well-known manner, and is formed of relatively long side channels connected by cross-braces so that the chassis frame may weave and distort to a limited extent without destruction. Such distortion of the main frame may be caused either by irregularities in the road acting through the main supporting springs to suddenly displace one side of the chassis 13 relatively to the other, or by sudden loading of one side of a body or container supported upon the chassis frame, and the relative displacement or flexing of the main frame frequently exceeds an inch and may reach two inches in exceptional cases.

The improved flexible support or three point suspension shown in Figs. 1 and 2, comprises a pivotal mounting for the front end of the tank 10 and auxiliary frame 11 permitting vertical swinging of the rear portions of these elements, and a resilient support for the rear ends of the elements.

The front pivotal mounting consists of a transverse pivot 14 supported in brackets 15 secured to the side beams of the chassis frame 13 and coacting with other brackets 16 secured to the forward end of the auxiliary frame 11. This pivotal support is associated with the portion of the main tractor frame which is remote from the wheels and is therefore subject to least deflection or distortion, so that the pivotal action will not be interfered with by flexing of the rear portion of the chassis. The rear resilient support consists of a transverse leaf spring 17 having its medial portion in direct supporting coaction with the rear central portion of the auxiliary frame 11, and having its opposite ends movably connected through links 18 with brackets 19 secured to the rear side portions of the chassis frame 13. A buffer spring 20 of the helical compression type, is interposed between the central rear portion of the chassis frame 13 and a plate 21 coacting with tension adjusting nuts 22 screw threaded upon the lower end of a tension rod 23 the upper end of which is pivotally connected to a bracket 24 attached to the central rear portion of the auxiliary frame 11. This resilient support is associated with the portion of the main tractor frame which is near the rear wheels and which therefore is subject to greatest deflection or distortion, and the leaf spring 17 functions to prevent such deflection of the main frame 13 from excessively stressing or straining the auxiliary frame 11 and tank 10 while the coil spring 20 checks the swaying action of the tank and prevents rebound due to the inertia thereof.

The improved flexible support specifically shown in Figs. 3 and 4, likewise comprises a pivotal mounting for the front end of the tank 10 and auxiliary frame 11 permitting vertical swinging of the rear portion of these elements, and a resilient support for the rear ends of the elements. The front pivotal mounting is similar to that shown in Figs. 1 and 2 and consists of a transverse pivot 14 supported in brackets 15 secured to the side beams of the chassis frame 13 and coacting with other brackets 16 secured to the forward end of the auxiliary frame 11. This pivotal support is again associated with the portion of the main tractor frame which is located some distance from the wheels and is therefore subject to least deflection or distortion. The rear resilient support of this modification consists of a transverse leaf spring 27 having its medial portion in direct supporting coaction with the rear central portion of the auxiliary frame 11, and having its opposite ends slidably engaging special brackets 28 secured to the rear side portions of the chassis frame 13. A buffer spring 29 of the helical compression type is interposed between the central rear portion of the chassis frame 13 and a plate 30 coacting with tension adjusting nuts 31 screw threaded upon the lower end of a tension rod 32 the upper end of which is pivotally connected to a bracket 33 attached to the central rear portion of the auxiliary frame 11, as in the case previously described. In addition to the buffer spring 29 a link 34 has one end pivotally attached to the bracket 33 and has its opposite end pivotally attached to one of the brackets 28, and this link assists the buffer spring 29 in preventing undesirable side displacement of the tank 10. This resilient support is likewise associated with the portion of the main tractor frame 13 which is near the rear wheels and which therefore is subject to greatest deflection or distortion, and the leaf spring 27 again functions to prevent such deflection of the main frame 13 from unduly stressing or straining the auxiliary frame 11 and tank 10, while the coil spring 29 checks the swaying action of the tank and prevents rebound due to inertia. As previously indicated, the link 34 positively retains the rear end of the tank 10 and auxiliary frame 11 centrally of the tractor frame 13.

The improved flexible support specifically illustrated in Figs. 5 and 6 also comprises a pivotal mounting for the front end of the tank 10 and auxiliary frame 11 permitting vertical swinging of the rear portions of these elements, and a further modified resilient support for the rear ends of the elements. The front pivotal mounting is identical with that previously described and consists of a transverse pivot 14 supported in brackets 15 secured to the side beams of the chassis frame 13 and coacting with other brackets 16 secured to the forward end of the auxiliary frame 11. This pivotal support is again associated with the portion of the main frame 13 remote from the wheels, and this portion of the main frame is therefore subject to least deflection or distortion. The modified rear resilient support consists of a pair of leaf springs 37 located one on each side of the main frame 13 and extending longitudinally thereof. The medial portion of each leaf spring 37 is in direct supporting coaction with one of the side beams of the auxiliary frame 11, and the opposite ends of each leaf spring 37 are movably connected through links 38 with brackets 39 which are secured to the adjacent side beam of the chassis frame 13. A buffer spring 40 of the helical compression type is interposed between the central rear portion of the chassis frame 13 and a plate 41 coacting with tension adjusting nuts 42 having screw thread coaction with the lower end of a tension rod 43 the upper end of which is pivotally connected to a bracket 44 attached to the central rear portion of the tank 10. This resilient support is again associated with the portion of the main tractor frame 13 which is nearest the rear wheels and which therefore is subject to greatest deflection or distortion and the leaf spring 37 functions to prevent deflection of the main frame 13 from excessively stressing the auxiliary frame 11 and tank 10, while the buffer spring 40 checks the swaying action and rebound of the tank.

In some instances it may be desirable to provide the tank 10 with a liquid dispensing unit such as specifically illustrated in Figs. 3 and 4, this dispensing unit being located in a separate compartment 45 disposed at the rear end of the tank. Located within the compartment 45 is a pump 46 and a hose reel 47, and the hose may be withdrawn from the reel so as to permit delivery of fluid to or from the tank relative to any moderately distant point. The compartment 45 is accessible through doors 48 and suitable piping connects the pump 46 with the several compartments of the tank 10. The tank may also be provided with running boards 49 secured to the opposite sides thereof and supported by the auxiliary frame 11.

During normal use of the improved flexible suspensions, the vehicle of which the chassis frame 13 forms a part may be drawn over extremely rough and uneven ground, thus causing the frame 13 to deflect more or less. The greatest deflection in this frame will obviously take place near the frame supporting springs and at the point of greatest load, which is usually near the rear axle. The various flexible suspensions illustrated will effectively prevent such deflection from destructively affecting the rigid tank 10 and its relatively rigid auxilary supporting frame 11. The tank 10 may, however, swing in a vertical plane about the forward pivot 16, and the spring suspensions interposed between the rear of the auxiliary and main frames 11, 13 will effectively compensate for relative distortion or displacement of the side beams of the main frame 13. The buffer springs, on the other hand, prevent rebound due to inertia and serve as buffers restraining the action of the main springs.

From the foregoing description it will be apparent that the pivotal mounting at the forward end of the tank 10 provides a two-point support which will permit limited displacement of the rear end of the tank in a vertical plane. The rear flexible supporting springs provide the third point of support for the tank and permit deflection of the main frame 13 without undesirably stressing the tank 10 and its rigid supporting frame 11. The flexible support moreover protects the piping of a dispensing unit mounted within a compartment 45 upon the auxiliary frame 11, since this piping is not subject to stresses which might cause leakage by virtue of the fact that it is carried directly upon the auxiliary frame 11. The leaf springs may be formed of sufficient stiffness to resist the pressures to which they are subjected, and the links 34 may be utilized to prevent objectionable side displacement of the rear end of the tank 10. The invention therefore provides a simple and highly efficient flexible mounting which has demonstrated its ability to produce the new results herein set forth.

It should be understood that it is not desired to limit the invention to the exact details of construction herein shown and described, for various modifications within the scope of the claims may occur to persons skilled n the art.

It is claimed and desired to secure by Letters Patent:

1. In combination, an inherently deflectible frame structure, a rigid structure disposed in vertical alinement with said frame structure, a pivotal connection between corresponding end portions of said structures, a leaf spring having its medial portion rigidly connected to the opposite end portion of one of said structures, and a pivoted rigid link connecting each end of said spring with the corresponding opposite end portion of the other of said structures.

2. In combination, an inherently deflectible frame, a rigid structure disposed above said frame, a pivotal connection between corresponding end portions of said frame and structure, a leaf spring having its medial portion rigidly connected to the opposite end of said structure, and a pivoted rigid link connecting each end of said spring with the corresponding opposite end portion of said frame.

3. In combination, an inherently deflectible frame structure, a rigid structure disposed in vertical alinement with said frame structure, a pivotal connection between corresponding end portions of said structures, a leaf spring having its medial portion rigidly connected to the opposite end portion of one of said structures, a pivoted rigid link connecting each end of said spring with the corresponding opposite end portion of the other of said structures, and resilient means coacting with said leaf spring to check the action of the latter.

4. In combination, an inherently deflectible frame, a rigid structure disposed above said frame, a pivotal connection between corresponding end portions of said frame and structure, a leaf spring having its medial portion rigidly connected to the opposite end of said structure, a pivoted rigid link connecting each end of said spring with the corresponding opposite end portion of said frame, and resilient means connecting the medial portion of said spring with said frame.

5. In combination, an inherently deflectible frame structure, a rigid structure disposed in vertical alinement with said frame structure, a pivotal connection between corresponding end portions of said structures, a leaf spring having its medial portion rigidly connected to the opposite end portion of one of said structures, pivoted links connecting the spring ends with the corresponding opposite end portion of the other of said structures, and a spring connecting the medial portion of said leaf spring with said other structure.

6. In combination, an inherently deflectible frame, a rigid structure disposed above said frame, a pivotal connection between corresponding end portions of said frame and structure, a leaf spring having its medial portion rigidly connected to the opposite end of said structure, pivoted links connecting the spring ends with the corresponding opposite end of said frame, and a coil spring interposed between the medial portion of said leaf spring and said frame.

JULIUS P. HEIL.